US008592010B2

(12) United States Patent
Fiebranz et al.

(10) Patent No.: US 8,592,010 B2
(45) Date of Patent: Nov. 26, 2013

(54) OPTICAL COMPENSATION FILMS

(75) Inventors: Bernd Fiebranz, Muenster (DE); Bernhard Rieger, Muenster (DE); Detlef Pauluth, Ober-Ramstadt (DE); Axel Jansen, Darmstadt (DE); Ulrich Siemann, Weil am Rhein (DE); Ilona Herm, Kandern (DE)

(73) Assignees: MERCK PATENT GmbH, Darmstadt (DE); LOFO HIGH TECH FILM GmbH, Weil am Rhein (DE)

( * ) Notice: Subject to any disclaimer, the term of this patent is extended or adjusted under 35 U.S.C. 154(b) by 766 days.

(21) Appl. No.: 12/705,053

(22) Filed: Feb. 12, 2010

(65) Prior Publication Data
US 2010/0208181 A1 Aug. 19, 2010

(30) Foreign Application Priority Data

Feb. 14, 2009 (DE) .......................... 10 2009 009 093

(51) Int. Cl.
*C09K 19/00* (2006.01)
(52) U.S. Cl.
USPC ............. 428/1.3; 428/1.1; 349/117; 349/118; 349/119; 359/489.07; 359/489.06; 252/299.61; 252/299.62; 252/299.63
(58) Field of Classification Search
USPC ............ 428/1.1, 1.3; 349/117, 118, 119, 120; 359/489.07, 489.06; 252/299.61, 252/299.62; 264/1.34
See application file for complete search history.

(56) References Cited

U.S. PATENT DOCUMENTS

| 6,559,912 | B2 | 5/2003 | Aminaka | |
|---|---|---|---|---|
| 6,778,242 | B1 | 8/2004 | Murayama et al. | |
| 2003/0218709 | A1 | 11/2003 | Ito et al. | |
| 2005/0012883 | A1* | 1/2005 | Umeda et al. | 349/117 |
| 2005/0195348 | A1* | 9/2005 | Saitoh et al. | 349/118 |
| 2006/0115608 | A1* | 6/2006 | Saito et al. | 428/1.3 |
| 2008/0213511 | A1 | 9/2008 | Ikeda | |

FOREIGN PATENT DOCUMENTS

CN 101231365 A 7/2008

OTHER PUBLICATIONS

Density of cellulose ester, Industrial and Eng. Chem., V39, No. 11, pp. 1499-1504, 1947.*
Density of Liquid Crystal, Molecular Crystals and LC, V72, pp. 139-145, 1982.*

* cited by examiner

*Primary Examiner* — Gwendolyn Blackwell
*Assistant Examiner* — Ruiyun Zhang
(74) *Attorney, Agent, or Firm* — Millen, White, Zelano & Branigan, P.C.

(57) ABSTRACT

The invention relates to compensation films for liquid-crystal displays with additions of rod-shaped liquid crystals mentioned below, to polarizer plates which have at least one compensation film of this type, to liquid-crystal displays which have compensation films of the said type, and to processes for the production of the said compensation films, polarizer plates and liquid-crystal displays, to the use of the compounds described in greater detail below as additions to compensation films for liquid-crystal displays, and to further subject-matters of the invention which can be seen below.

31 Claims, 3 Drawing Sheets

OPTICAL COMPENSATION FILMS

Disclosed are optical compensation films for liquid-crystal displays with additions of certain rod-shaped liquid crystals as described below, polariser plates which have at least one compensation film of this type, liquid-crystal displays which have compensation films of the said type, and processes for the production of the said compensation films, polariser plates and liquid-crystal displays, the use of the liquid-crystalline compounds described below as additions to compensation films for liquid-crystal displays, and further subject-matters which can be seen below.

For improving the viewing-angle dependence of the contrast and reducing the colour shift at greater viewing angles, optical compensation films are usually employed between the polariser films and the liquid-crystal cell in liquid-crystal displays. These films have specific optical retardation properties and are matched to the particular type of liquid-crystal display.

The term "LCD" is also used below for liquid-crystal displays. LCDs are known to the person skilled in the art. Commercially available TV sets, desktop monitors or laptops or notebooks usually contain a screen based on liquid-crystal technology. The backlighting here is polarised in a linear manner by a polarisation filter, passes through a liquid-crystal layer, which rotates the plane of polarisation of the light, for example depending on the desired brightness, and exits again through a second polarisation filter. Together with driver electronics, coloured filters and glass sheets, these components form the so-called "panel".

TFT (thin-film transistor) denotes the active-matrix variant of LCD panels which is usual today in desktop monitors and notebooks and in which each pixel is addressed by its own transistor. By contrast, passive-matrix displays only have control electronics at the edge, with the individual pixels being switched line-by-line and column-by-column. They are therefore significantly slower in image build-up and, owing to their lower power consumption, are principally employed in small equipment, such as mobile telephones, portable digital video equipment or MP3 players. The terms LCD and TFT monitor, although strictly speaking different, are in the meantime often used synonymously.

The panel types differ essentially through the type of alignment of the liquid crystals between the substrates of the liquid-crystal cell. In TN (twisted nematic) panels, the liquid-crystal molecules are aligned parallel to the surface of the substrates without an electric field, where their preferential direction perpendicular to the surface has a helical twist, and, on application of a voltage, align perpendicular to the surface of the applied electric field. They exhibit a comparatively high viewing-angle dependence, which can only be reduced partially using compensation films. They do not exhibit very fast switching behaviour.

In the case of in-plane switching (IPS), the liquid-crystal molecules are aligned parallel to the substrate surface, but with no twist. The liquid-crystal cell has an electrode layer on only one of the substrates. Consequently, on application of a voltage, an electric field is generated parallel to the substrate surface, re-aligning the liquid-crystal molecules within the panel area. The contrast is consequently significantly less dependent on viewing angle than in the case of TN panels. However, the viewing-angle dependence of colour display has also only been reduced through improved S-IPS and dual-domain IPS technology. The weak fields meant that the response times were initially very long, although current variants are highly competitive with fast VA panels.

The liquid-crystal molecules in VA (vertically aligned) panels are aligned substantially perpendicular to the substrate surface in the field-free state and have negative dielectric anisotropy, meaning that they are re-aligned parallel to the surface on application of an electric field between the substrates. Since VA panels do not allow the passage of light without an applied voltage, they achieve a deep black and thus very high contrast values. Sub-types include MVA (multi-domain VA), PVA (patterned VA) and ASV (advanced super view). These additionally divide the cells into regions with different preferential directions and thus achieve high viewing-angle stability. VA panels are distinguished, in particular, by short switching times, and consequently they and their production are preferred for the purposes of the invention.

The prior art discloses compensation films based on aligned, polymerised layers of reactive liquid crystals (often also known as "reactive mesogens" or "RMs") which are applied to a support film, for example a cellulose acetate film, such as, for example, triacetyl cellulose (TAC). The compensation films are usually laminated onto the polarisation film ("polariser"). The polariser typically consists of an iodine-impregnated and stretched PVA film and optionally one or two protective films. The protective films used are, for example, TAC films.

The prior art furthermore discloses that discotic (disc-shaped) liquid-crystal molecules are introduced directly into the TAC film, and a certain optical retardation action is achieved by stretching the TAC film. These TAC films can also be used directly as protective film for the polariser. Instead of discotic molecules, it is also possible to introduce calamitic (rod-shaped) liquid-crystal molecules directly into the TAC film.

In addition, arrangements are known in which one of the protective films of the polariser plate represents directly the optical compensation film, which facilitates particularly thin layers.

In addition, many other arrangements have been found, each of which has specific advantages. However, they all have in common that they have at least one optical compensation film in order to increase the viewing angle.

This can consist, for example, of a cellulose acylate, in particular a cellulose $C_1$-$C_7$-alkanoate (Z—$C_1$-$C_7$-A), for example cellulose acetate and/or propionate (for example CAP) or preferably cellulose acetate (triacetyl-cellulose, TAC), as the basis. A cellulose acylate film is normally optically isotropic with respect to the axis perpendicular to the film surface (with relatively low retardation). In order to be useful as optical compensation film, however, it must exhibit optical anisotropy and preferably high optical retardation. Besides stretched birefringent synthetic polymer materials, anisotropic layers, which comprise discotic molecules and are produced by aligning the discotic molecules and subsequently fixing them in the aligned form, have also been proposed. U.S. Pat. No. 6,559,912 and US 2003/0218709 describe cellulose acetate films comprising discotic molecules, for example based on 1,3,5-triazine, or polymeric liquid crystals or ketone, ether and/or ester compounds, or those containing polymerisable radicals.

U.S. Pat. No. 6,778,242 describes compensation films based on TAC films comprising calamitic or discotic liquid-crystal molecules which contain at least two aromatic ring systems.

On use of such additives, however, difficulties may arise, for example with compatibility with the solvents and other additives used in the production of Z—$C_1$-$C_7$-A (in particular TAC) films. In addition, poor durability of the resultant films may arise owing to low compatibility of the additives used with the end products or due to high volatility and/or diffusion tendency.

In addition, as already indicated above, there is a wide range of different LCD systems, meaning that it may be difficult to match films to the desired conditions. Thus, it is conceivable for only one film or two or more films to be used for compensation, and for the properties, such as thickness and weight, etc., of the compensation film(s) having to be adaptable to certain requirements of an LCD, depending on the thickness and other requirements.

The optical retardation Ro of the optical compensation film in the direction of the film plane (so-called "in-plane" retardation; often also known as Re) and Rth in the direction of the film thickness (so-called "out-of-plane" retardation) are described by the following formulae:

$$Ro(=Re)=(nx-ny)\times d \quad (IV)$$

$$Rth=\{nz-[(nx+ny)/2]\}\times d \quad (V)$$

nx here is the refractive index along the slow axis in the film plane (i.e. the axis having the greatest refractive index, i.e. the direction of vibration in which a wave has the slower propagation velocity); ny is the refractive index along the fast axis (i.e. the axis having the smallest refractive index, i.e. the direction of vibration in which a wave has the faster propagation velocity) in the plane of the film perpendicular to nx; nz is the refractive index in the direction of the film thickness (i.e. perpendicular to nx and ny); d is the thickness of the film (in nm).

For unstretched negative-C compensation films, nx=ny>nz generally applies, giving rise to negative values of Rth using the formula (V).

The establishment of suitable values of Ro and Rth depends on the type of liquid-crystal cell used in each case and the resultant change in the state of polarisation on addressing of the cell.

Different retardation values for correction are required for the usual display types for the display of images, such as, for example, TN (twisted nematic), STN (supertwisted nematic), VA (vertically aligned) and IPS (in-plane switching).

It has furthermore been found that the TAC films proposed in the prior art often have inadequate dispersion (dependence of the birefringence or retardation on the light wavelength), which, in particular in the case of VA-LCDs, results in an impairment of the contrast, especially at large viewing angles (i.e. in the case of a large deviation from the viewing angle perpendicular to the display).

In view of the above-mentioned difficulties, the object is to find compensation films which enable precise setting of the retardation values Ro (=Re) and Rth and have high long-term stability of these values, in which the additives used have good compatibility, both during production and also in the end product, and do not cause any coloration or haze, and with which the requisite optical properties can be adapted flexibly to desired displays by means of suitable measures, such as stretching, for example with respect to the usable thickness and the question of whether only one compensation film can be employed instead of two. If the substances used are compatible over a large concentration range, the retardation values can be varied both via the concentration of the additives used and also through specifically matched aftertreatment, which would give rise to high flexibility for the application.

Furthermore, the compensation films should have matched optical dispersion, and, in particular in the case of VA-LCDs, facilitate high contrast, even at large viewing angles.

It has now been found that the use of certain rod-shaped compounds enables one or all of the aims indicated under objective to be achieved.

In particular, it has been found that liquid-crystalline or mesogenic compounds having at most one aromatic ring are particularly suitable as additives for TAC films for use in compensation films.

It has been found that these compounds exhibit very good retardation properties and adequate stability (temperature/moisture storage test). It has furthermore been found that, on use in TAC films, these compounds exhibit modified dispersion of the retardation compared with compounds having more than one aromatic ring. Improved dispersion of the TAC film or compensation film can thus be achieved, which can contribute to an increase in the angle-dependent contrast for VA-LCDs. LCD simulation calculations have shown that, in particular, negative dispersion (i.e. the optical retardation increases with increasing wavelength) of the Ro value ("in-plane" retardation) results in an improvement in the contrast ratios for the displays.

In one aspect the invention thus relates to an optical compensation film, preferably for liquid-crystal displays, based on cellulose acylate, in particular based on CAP or preferably cellulose acetate, characterised in that it comprises one or more compounds, preferably selected from mesogenic or liquid-crystalline compounds, particularly preferably calamitic (rod-shaped) compounds, having two or more rings, where at most one of these rings is an aromatic ring.

In a further aspect, the invention furthermore relates to a process for the production of an optical compensation film (preferably for liquid-crystal displays) which comprises one or more compounds having two or more rings as defined above and below, where these compounds are mixed with the starting materials for the compensation film during production. In a subsequent step, the film is preferably stretched in at least one direction, for example in one to three (x, y and z, for example in the z direction by means of shrink films subsequently to be discarded), preferably in two directions.

In a further aspect, the invention furthermore relates to a polarisation plate (preferably for liquid-crystal displays) which has a pair of transparent protective films and a polarising membrane between the protective films, where at least one of the transparent protective films comprises at least one optical compensation film based on cellulose acylate which comprises one or more compounds having two or more rings as defined above and below, and to a process for the production thereof.

In a further aspect, the invention furthermore relates to a liquid-crystal display which has at least one optical compensation film which comprises one or more compounds having two or more rings as defined above and below, and to a process for the production thereof.

In a further aspect, the invention furthermore relates to the use of one or more compounds having two or more rings as defined above and below for the production of optical compensation films for liquid-crystal displays, where at least one of these compounds is added to at least one compensation film during the production of the compensation film, and, in a further step, the compensation film is then preferably used for the production of a liquid-crystal display.

The general expressions and symbols used above and below preferably have, unless indicated otherwise, the meanings given above or below, unless they have already been defined above in the introduction, where one, more or all of the more general expressions or symbols may be replaced, independently of the others, by more specific definitions given below for each subject-matter of the invention, which in each case results in preferred embodiments of the invention.

In one aspect the compensation films according to the invention exhibit optical anisotropy, i.e. different refractive indices n in at least two of the spatial directions x, y and z. The birefringence $\Delta n_o$ of the optical compensation film in the direction of the film plane and $\Delta n_{th}$ in the direction of the film thickness are described by the following formulae:

$$\Delta n_o(=\Delta n_e)=(nx-ny) \quad (I)$$

$$\Delta n_{th}=\{nz-[(nx+ny)/2]\} \quad (II)$$

nx here is the refractive index along the slow axis in the film plane (i.e. the axis having the greatest refractive index, i.e. the direction of vibration in which a wave has the slower propagation velocity); ny is the refractive index along the fast axis (i.e. the axis having the smallest refractive index, i.e. the direction of vibration in which a wave has the faster propagation velocity) in the plane of the film perpendicular to nx; nz is the refractive index in the direction of the film thickness (i.e. perpendicular to nx and ny).

The optical retardation R of a compensation film is defined as the product of the birefringence $\Delta n$ and the layer thickness d in accordance with the following formula:

$$R=\Delta n \times d \quad (III)$$

The retardation of the optical compensation film Ro in the direction of the film plane ("in-plane" retardation) or Rth in the direction of the film thickness ("out-of-plane" retardation) is thus given by the following formulae:

$$Ro(=Re)=(nx-ny) \times d \quad (IV)$$

$$Rth=\{nz-[(nx+ny)/2]\} \times d \quad (V)$$

where d denotes the film thickness.

The refractive index, the birefringence and the optical retardation usually change as a function of the light wavelength. This dependence is also known as (optical) dispersion. Most optical media exhibit a decrease in refractive index with increasing wavelength (normal dispersion). By contrast, some optical media exhibit an increase in refractive index with increasing wavelength (anomalous dispersion).

Above and below, the term "negative (optical) dispersion" denotes a material or film having anomalous dispersion, in which the absolute value of the birefringence ($\Delta n$) increases with increasing wavelength ($\lambda$), for example $|\Delta n(450)|<|\Delta n(550)|$ and $\Delta n(450)/\Delta n(550)<1$, where $\Delta n(450)$ and $\Delta n(550)$ denote the birefringence at a wavelength of 450 nm and 550 nm respectively. The term "positive (optical) dispersion" denotes a material or film having normal dispersion, in which the absolute value of the birefringence ($\Delta n$) decreases with increasing wavelength ($\lambda$), for example $|\Delta n(450)|>|\Delta n(550)|$ and $\Delta n(450)/\Delta n(550)>1$. See also A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a certain wavelength is directly proportional to the layer thickness, the optical dispersion can either be quoted as the birefringence dispersion, for example by the ratio $\Delta n(450)/\Delta n(550)$, or as the retardation dispersion, for example by the ratio $R(450)/R(550)$, where $R(450)$ and $R(550)$ denote the retardation at a wavelength of 450 nm and 550 nm respectively.

Since the layer thickness does not change with wavelength, $R(450)/R(550)<1$ and $|R(450)|<|R(550)|$ also apply in a material or film having negative or anomalous dispersion, analogously to the birefringence, and $R(450)/R(550)>1$ and $|R(450)|>|R(550)|$ in a material or film having positive or normal dispersion. This applies equally to the retardation values Ro and Rth.

The retardation ($R(\lambda)$) of a material can be determined by ellipsometry, for example using an "M2000 spectroscopic ellipsometer" from J. A. Woollam Co. This enables the optical retardation of a birefringent sample (in nm) to be measured over a certain wavelength range, typically from 370 nm to 1000 nm. The dispersion ($R(450)/R(550)$ or $\Delta n(450)/\Delta n(550)$) can be calculated from these values.

The retardation values indicated above and below were measured, unless indicated otherwise, using a Woollam WVASE M2000 spectroscopic ellipsometer.

The values indicated above and below for the retardation R, the refractive index n and the birefringence $\Delta n$ relate, unless indicated otherwise, to a wavelength of 550 nm (measured at room temperature).

The term "ring" denotes a carbocyclic, heterocyclic, aromatic or hetero-aromatic, organic radical. The rings can be saturated or partially or fully unsaturated. Saturated or partially unsaturated rings are referred to below as "non-aromatic" and fully unsaturated rings are referred to below as "aromatic". The rings can be monocyclic or polycyclic (such as, for example, bicyclooctane) or have a spiro link (such as, for example, spiro[3.3]heptane).

Two or more of these rings may also be connected by a single bond or a bridging group, or together form a condensed radical. Thus, for the purposes of this application, a cyclohexyl or cyclohexenyl radical, for example, is a non-aromatic ring, a bicyclooctyl radical is a polycyclic, non-aromatic ring, a spiroheptyl radical is a spiro-linked, non-aromatic ring, a phenyl radical is an aromatic ring, a naphthyl radical is a condensed radical consisting of two aromatic rings, and an indane radical is a condensed radical consisting of one aromatic ring and one non-aromatic ring.

Optical compensation films are also referred to below merely as "compensation films". In accordance with an aspect of the invention, preference is given to optical compensation films based on cellulose acylate, in particular based on CAP or preferably cellulose acetate.

Cellulose acylate denotes, in particular, a cellulose triacylate, where the acyl radicals may be identical or (in particular randomly) different, preferably a corresponding cellulose tri-$C_1$-$C_7$-alkanoate, preferably tri-$C_1$-$C_4$-alkanoate, such as butyrate, propionate and/or acetate, such as, in particular, CAP (cellulose acetopropionate) or TAC (cellulose triacetate or triacetylcellulose).

The degree of acyl substitution (DS), i.e. the number of acyl radicals bonded per cellulose sub-unit (monosaccharide sub-unit having 6 carbon atoms), is preferably 2.4 to 3, in particular between 2.7 and 2.98.

In the case of triacetylcellulose, for example, the cellulose acetate preferably has an acetic acid content of 59.0 to 61.5%, in particular 59.5 to 61.3%. The term "acetic acid content" here denotes the amount by weight of bonded acetic acid per $C_6$ sub-unit of the acetylcellulose. The experimental determination can be carried out, for example, in accordance with ASTM: D-817-91 ("Tests of Cellulose Acetate") or corresponding procedures. Unless indicated otherwise, the values indicated above and below for the acetic acid content relate to the ASTM: D-817-91 method.

The polymolecularity (the ratio of weight average to number average), also known as polydispersity, i.e. the ratio of weight average molecular weight ($M_w$) to number average molecular weight ($M_n$), for cellulose acetate films according to the invention or cellulose acetate films which can be produced in accordance with the invention can be, for example, in the range from 1.5 to 7, such as, for example, between 2 and 4. The molecular weight here is determined by means of gel permeation chromatography using chloroform or methylene chloride as solvent.

In an aspect, a compensation film according to the invention is preferably a stretched film, in particular a film stretched in two directions (biaxially), whose thickness, stretching parameters and content of compounds having two or more rings or condensed rings as defined above and below are selected in such a way that it has the retardation values Ro (=Re) and Rth indicated as preferred below.

In a further aspect, a compensation film according to the invention preferably has a content of 0.5 to 10 percent by weight, in particular 2 to 8 percent by weight, even more preferably 2 to 6 percent by weight, in each case based on the total weight of the compensation film, of compounds having two or more rings or condensed rings as defined above and below.

"Weight" (for example in percent by weight or % by weight) in this disclosure is synonymous with mass.

In another aspect, the cellulose acylate-based optical compensation film according to the invention comprises at least one compound having two or more rings as defined above and below, in particular for establishment of a suitable retardation Ro and Rth as defined above. The processes for the preparation of products according to the invention and the use preferably likewise include as functional feature the purpose of establishing a suitable retardation Ro and Rth as defined above.

The compounds according to the invention having two or more rings are preferably selected from formula I in which
R$^1$ and R$^2$ each, independently of one another, denote F, Cl, Br, I, OH, —CN, —NO$_2$, —NCO, —NCS, —OCN, —SCN, —NH$_2$, —SF$_5$, straight-chain or branched alkyl or alkoxy having 1 to 12 C atoms, in which, in addition, one or more CH$_2$ groups may be replaced by —O—, —S—, —CO—, —CO—O—, —O—CO—, —O—CO—O—, —CH=CH—, —C≡C—, —NR$^0$—, —CO—NR$^0$—, —NR$^0$—CO— in such a way that O and/or S atoms are not linked directly to one another, and in which, in addition, one or more H atoms may be replaced by F, Cl or CN,
A$^1$ and A$^2$ each, independently of one another, denote a radical selected from
the group A) consisting of non-aromatic, mono- or polycyclic, carbo- or heterocyclic rings having 5 to 10, preferably 5, 6, 7 or 8, ring atoms, where, in addition, two or more of these rings may form a condensed radical, and where the individual rings may, in addition, be mono- or polysubstituted, and/or
the group B) consisting of aromatic or heteroaromatic rings having 5 to 10, preferably 5 or 6, ring atoms, which may, in addition, be mono- or polysubstituted, and/or
the group C) consisting of condensed radicals consisting of one or more rings from group A) and precisely one ring from group B), where the individual rings may, in addition, be mono- or polysubstituted,
where at most one of the radicals A$^1$ and A$^2$ present is selected from group B) or C),
Z$^1$ on each occurrence, identically or differently, denotes —COO—, —OCO—, —CH$_2$O—, —OCH$_2$—, —CH$_2$S—, —SCH$_2$—, —CF$_2$O—, —OCF$_2$—, —CH$_2$CH$_2$—, —CH$_2$CF$_2$—, —CF$_2$CH$_2$—, —C$_2$F$_4$—, —CH=CH—, —CH=CF—, —CF=CH—, —CF=CF—, —C≡C— or a single bond, preferably —COO—, —OCO— or a single bond,
R$^0$ denotes hydrogen or C$_1$-C$_7$-alkyl, and
m denotes an integer 1, 2, 3, 4 or 5.

Particular preference is given to compounds according to the invention containing precisely one aromatic ring.

Preference is furthermore given to compounds according to the invention containing no aromatic ring.

Particular preference is given to compounds of the formula I containing exclusively one or more radicals from group A), in particular those in which m is 2, 3 or 4.

Preference is furthermore given to compounds of the formula I containing precisely one radical from group B) or C), in particular those in which m is 2, 3 or 4.

In a further aspect, in the compounds according to the invention, a substituted ring preferably denotes a ring which is mono- or polysubstituted by L, where L on each occurrence, identically or differently, denotes OH, CH$_2$OH, F, Cl, Br, I, —CN, —NO$_2$, —NCO, —NCS, —OCN, —SCN, SF$_5$, —C(=O)N(R$^0$)$_2$, —C(=O)Y$^1$, —C(=O)R$^0$, —N(R$^0$)$_2$, optionally substituted silyl, straight-chain or branched alkyl or alkoxy having 1 to 25 C atoms, or straight-chain or branched alkenyl, alkynyl, alkylcarbonyl, alkoxycarbonyl, alkylcarbonyloxy or alkoxycarbonyloxy having 2 to 25 C atoms, in which, in addition, one or more H atoms in all these groups may be replaced by F, Cl or CN, and Y$^1$ denotes halogen.

Particularly preferred radicals from group A) are selected from the group consisting of cyclohexane-1,4-diyl, in which, in addition, one or more non-adjacent CH$_2$ groups may be replaced by O and/or S ("six-membered O/S-heterocyclic rings"), cyclohexene-1,4-diyl, piperidine-1,4-diyl, bicyclo[1.1.1]-pentane-1,3-diyl, bicyclo[2.2.2]octane-1,4-diyl, spiro[3.3]heptane-2,6-diyl, decahydronaphthalene-2,6-diyl and octahydro-4,7-methanoindane-2,5-diyl, where all these radicals may be unsubstituted or mono- or polysubstituted by L.

Particularly preferred radicals from group B) are selected from the group consisting of 1,4-phenylene, in which, in addition, one or more CH groups may be replaced by N ("six-membered N-heteroaromatic rings"), pyrrole-2,5-diyl, furan-2,5-diyl, thiophene-2,5-diyl, imidazole-2,5-diyl, 1,3-oxazole-2,5-diyl, 1,3-thiazole-2,5-diyl, pyrazole-3,5-diyl, isoxazole-3,5-diyl and isothiazole-3,5-diyl, where all these radicals may be unsubstituted or mono- or polysubstituted by L.

Particularly preferred radicals from group C) are 1,2,3,4-tetrahydronaphthalene-2,6-diyl and indane-2,5-diyl, each of which may be unsubstituted or mono- or polysubstituted by L.

Particularly preferred six-membered O/S-heterocyclic rings are tetrahydropyran-2,5-diyl, 1,3-dioxane-2,5-diyl and 1,3-dithiane-2,5-diyl.

Particularly preferred six-membered N-heteroaromatic rings are pyridine-2,5-diyl, pyrimidine-2,5-diyl, pyridazine-3,6-diyl and 1,3,5-triazine.

Very particular preference is given to compounds of the formula I in which A$^1$ and A$^2$ each, independently of one another, denote where one of the radicals $A^1$ and $A^2$ present may optionally also denote in which $L^1$ and $L^2$ each, independently of one another, denote H, F or Cl.

Particularly preferred compounds of the formula I are selected from the following sub-formulae:

I1

I2

I3

I4

I5

I6 in which $R^1$ and $R^2$ have the meanings indicated in formula I, and $L^1$ and $L^2$ each, independently of one another, denote H or F.

In the compounds of the formula I and the sub-formulae thereof, $R^1$ and $R^2$ each, independently of one another, preferably denote straight-chain alkyl or alkoxy having 1 to 7 C atoms or straight-chain alkenyl having 2 to 6 C atoms. $R^1$ particularly preferably denotes $CH_3$, $C_2H_5$, n-$C_3H_7$, n-$C_4H_9$, n-$C_5H_{11}$, $OCH_3$ or $OC_2H_5$. $R^2$ particularly preferably denotes F, CN, $NH_2$, NCS, $CH_3$, $C_2H_5$, n-$C_3H_7$, n-$C_4H_9$, n-$C_5H_{11}$, $OCH_3$ or $OC_2H_5$. Preferred alkenyl groups are $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— and $CH_3$—CH=CH—$(CH_2)_2$—.

Particular preference is given to compounds of the formula I, in particular those of the formulae I2, I3 and I4, in which one of the radicals $R^1$ and $R^2$, preferably $R^2$, denotes —C≡C—CN or —C≡C—$CH_3$.

Preference is furthermore given to compounds of the formula I, in particular those of the formula I5, in which one of the radicals $R^1$ and $R^2$, preferably $R^2$, denotes —NCS.

Preference is furthermore given to compounds of the formula I, in particular those of the formulae I2, I3 and I4, in which one of the radicals $R^1$ and $R^2$, preferably $R^1$, denotes an alkenyl group having 2 to 7 C atoms.

Preference is furthermore given to compounds of the formula I and the sub-formulae thereof in which $R^1$ stands for $R^3$—$Z^3$— and/or $R^2$ stands for $R^4$—$Z^4$—, where $R^3$ and $R^4$ each, independently of one another, denote alkyl or alkoxy having 1 to 12, preferably 1 to 7, C atoms, and $Z^3$ and $Z^4$ each, independently of one another, denote —CO—, —CO—O—, —O—CO—, —CONR$^0$— or —NR$^0$CO—. $Z^3$ and $Z^4$ preferably denote —CO—O— or —O—CO—. Further preferred compounds of the formula I and the sub-formulae thereof are those in which $R^1$ stands for $R^3$—CO—O— and/or $R^2$ stands for $R^4$—CO—O—, and those in which $R^1$ stands for $R^3$—O—CO— and/or $R^2$ stands for $R^4$—O—CO—.

$Z^1$ in formula I preferably denotes —COO—, —OCO— or a single bond, particularly preferably a single bond.

Very particular preference is given to compounds selected from the following sub-formulae:

I1a

I2a

I3a

I4a

I4b

I5a in which alkyl and alkyl* each, independently of one another, denote a straight-chain alkyl radical having 1, 2, 3, 4, 5 or 6 C atoms, alkenyl denotes a straight-chain alkenyl radical having 2, 3, 4, 5 or 6 C atoms, (O) denotes an oxygen atom or a single bond, $X^0$ denotes CN or $CH_3$, and $L^1$ and $L^2$ each, independently of one another, denote H or F. Alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

In the sub-formulae given above, $L^1$ preferably denotes F and $L^2$ denotes H or F, preferably F.

"Include" or "comprise" or "have" means that, besides the features and/or constituents listed, further features, process steps and/or constituents may also be present, i.e. the list is not definitive. By contrast, "consist of" means that only the said features, process steps and/or constituents are present in the embodiment characterised in this way.

The compounds of the formula I and the sub-formulae thereof can be prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail.

Further suitable processes for the preparation of compounds of the formula I and the sub-formulae thereof are described in the literature. Compounds of the formulae I1 to I6 and the preparation thereof are described, for example, in EP 0 087 102 A1, EP 0 062 470 A1 and DE 32 27 916 A1, or can be prepared analogously to the processes described therein.

The compounds of the formula I and the sub-formulae thereof can be prepared by conventional processes which are familiar to the person skilled in the art, for example by Suzuki cross-coupling—which can also be carried out consecutively—of corresponding aromatic boronic acids or boronic acid esters to suitably substituted phenyl compounds. Preference is given here to halophenyl compounds, in particular bromo- or iodophenyl compounds.

In a preferred embodiment of the invention, the compensation film consists of only one compound of the formula I.

In a further preferred embodiment of the invention, the compensation film consists of two or more than two compounds of the formula I. Particularly preferred compensation films of this type preferably consist of 2 to 15, particularly preferably 2 to 10, very particularly preferably 2, 3, 4 or 5, compounds of the formula I.

In a further preferred embodiment of the invention, only one (i.e. precisely one) compensation film is employed per liquid-crystal cell or liquid-crystal display.

In a further preferred embodiment of the invention, two or more than two compensation films are employed per liquid-crystal cell or liquid-crystal display.

In the latter case, the compensation film according to the invention is preferably employed for the compensation of a VA (vertically aligned) liquid-crystal display, where, in the case of two compensation films used, the retardation Ro for each of the films is preferably in the range from 30 to 70 nm, in particular 40 to 60 nm, and the retardation Rth is preferably in the range from −100 to −160 nm, in particular −120 to −140 nm, and in the case of only one compensation film for the VA display, the retardation Ro is preferably in the range from 30 to 90 nm, in particular 50 to 70 nm, and the retardation Rth is preferably in the range from −160 to −270 nm, in particular −180 to −250 nm (preferred retardation values, preferred retardation ranges).

In a further preferred embodiment, the compensation film exhibits negative dispersion of the retardation Ro, where Ro(450)/Ro(550)<1 or |Ro(450)|<|Ro(550)|, where Ro(450) and Ro(550) denote the retardation at wavelengths of 450 nm and 550 nm respectively.

In a further preferred embodiment, the compensation film exhibits positive dispersion of the retardation Ro, where Ro(450)/Ro(550)>1 or |Ro(450)|>|Ro(550)|, where Ro(450) and Ro(550) denote the retardation at wavelengths of 450 nm and 550 nm respectively.

In a preferred embodiment, for example, the following procedure is followed in the process according to the invention for the production of a compensation film: for a liquid-crystal display This preferred embodiment of the invention relates to a process for the production of optical compensation films of the type according to the invention (as defined above and below or in the claims), where at least one compound of the formula I is added to the mixture used in the production of the compensation films during a conventional process for the production of such films.

The constituents of the mixture used (in a solvent or solvent mixture in the case of a film-casting process) are preferably added (in one batch or preferably stepwise, for example using pre-prepared (for example with stirring or dispersion) solutions of components, such as the cellulose ester (cellulose acylate), in particular CAP or preferably cellulose acetate) to the plasticiser(s) and optionally one or more additives or a mixture thereof, and then converted into a compensation film in accordance with the invention by means of a conventional process, preferably the solution casting (=film-casting) process, on a corresponding film-casting machine with controlled spread onto a suitable substrate, such as a metal belt (for example made from steel foil), and controlled drying, preferably by known processes, as described, for example, in US 2005/0045064 A1, which is incorporated herein in this respect by way of reference.

It is particularly advantageous that, in view of the good solubility of the compounds of the formula I in the solvents/solvent mixtures used, these compounds can also be added in the form of concentrates having an increased concentration thereof compared with the final concentration—this is a preferred variant of the production. For example, the compound or compounds of the formula I can be added in a solution which is concentrated by a factor of 1.05 to 10, such as 1.3 to 5, compared with the final concentration (which may also comprise further additives), for example in-line (in the pump line) using suitable mixers, such as static mixers.

Suitable solvents or solvent mixtures are preferably cyclic or acyclic esters, ketones or ethers, each having 3 to 12 carbon atoms, or suitable halogenated (in particular chlorinated) solvents, such as, in particular, dichloromethane or chloroform, preferably in a mixture with a linear, branched or cyclic alcohol, in particular methanol, where the alcohol may also be fluorinated. A mixture of a chlorinated hydrocarbon, such as, in particular, methylene chloride, and an alcohol, in particular methanol, is preferably used. In the case of mixtures of one of the said non-alcoholic solvents and one of the said alcoholic solvents, the volume ratio thereof is preferably in a range from 75:25 to 98:2, for example 90:10 (non-alcoholic solvent:alcoholic solvent, v/v).

This is preferably followed by stretching in order to be able to set the retardation Ro and Rth in each case well in the preferred range (and preferably at the same time to reduce the virtual distortion). The stretching here is carried out monoaxially, without or preferably with holding perpendicular to the stretching direction, or preferably biaxially in order to reduce the distortion in all directions. The stretching is preferably in the range from 1 to 100% (1.01- to 2-fold stretching), for example in a preferred embodiment of the invention in the range from 3 to 40% (1.03- to 1.4-fold stretching), based on the original length or width of the compensation film. The biaxial stretching can be carried out simultaneously or in separate steps. The compensation film taken off the belt is, for example, firstly stretched longitudinally and then laterally and then dried completely, or, in the case of non-continuous production of the film, which is firstly dried completely and wound up, stretching is firstly, for example, carried out longitudinally in a separate working step and then laterally or simultaneously.

The film is stretched at elevated temperatures, where the temperature should preferably be in the region of the glass-transition temperature of the film material. In certain cases, for example in the case of partially crystalline materials, the stretching temperature may also be up to 30° C. above the glass-transition temperature of the film material. The film can be stretched under dry conditions. For the longitudinal stretching, the film can be stretched by rollers, for example through the take-off velocity being slower than the rolling-up velocity, and without or preferably with lateral holding (for example by clips). Alternatively, separate stretching can be carried out in a stretching machine.

In order to achieve good combinability with an adhesive for the lamination of polariser layers (in particular based on PVA) (especially improved adhesion), the protective film obtained is preferably partially hydrolysed in a further step in order to increase the hydrophilicity at the surface, for example by means of an aqueous base, such as an alkali metal hydroxide, in particular KOH or NaOH, at temperatures in the range from 0 to 80° C., for example at about 50° C., where the hydrolysis can take, for example, 0.1 to 10 minutes, in a possible preferred variant, for example, 1 to 3 minutes. This is followed by one or more washing steps, for example with water of suitable purity, and drying.

The film can then, optionally after the application of adhesive and protective layers and optionally after cutting, be stored in flat form or in rolled-up form.

In yet another aspect, a polariser plate according to the invention comprises two transparent protective films and a polariser membrane in between. An optical compensation film according to the invention can be used as one of the protective films, or applied to one of the protective films. A conventional cellulose acylate film, in particular cellulose $C_1$-$C_7$-alkanoate film, in particular CAP film or preferably cellulose acetate film, can be used as the other protective film (or for both protective films).

The polarisation membrane used can be, for example, iodine-containing polarisation membranes, polyene-based polarisation membranes or polarisation membranes comprising dichroic dyes. Iodine-containing and dye-containing polarisation membranes are usually produced from polyvinyl alcohol films. The transmission axis of the polariser membrane is positioned essentially perpendicular to the stretching direction of the film according to the invention.

The slow axis of the compensation film can be aligned essentially perpendicular or essentially parallel to the transmission axis of the polariser membrane.

During production of the polariser plate, the polariser membrane and the protective films are (generally) laminated with an aqueous adhesive, for which purpose the protective films (one of which can preferably be directly a compensation film according to the invention) are preferably hydrolysed on the surface as described above.

In the production of circular-polarising polariser plates, a compensation film according to the invention can also be positioned in such a way that the slow axis of the compensation film is aligned essentially at an angle of 45 degrees to the transmission axis of the membrane (in the case of "essentially perpendicular" i.e. deviation from a right angle, deviation from 0° in the case of "essentially parallel").

"Essentially" preferably means that an above-mentioned angle can deviate by 5 degrees, for example by 4 degrees, in particular by 2 degrees, from an above-mentioned angle.

The thickness of a compensation film according to the invention is preferably in the range from 20 to 150 µm, in particular from 30 to 100 µm.

For the production of a liquid-crystal display, two polarisation plates produced as above with a total of one or two compensation films according to the invention are used for the production of liquid-crystal displays of the transmission or reflection type by conventional processes. The compensation film(s) according to the invention is or are positioned between the liquid-crystal cell and one or both of the polariser plates.

The liquid-crystal cells preferably work in accordance with the VA ("vertically aligned", including MVA="multidomain VA"), OCB ("optically compensated bend") or TN ("twisted nematic", including STN="supertwisted nematic", DSTN="double layer STN" technology or HAN="hybrid aligned nematic") principle (the VA principle is used particularly frequently in large TFT liquid-crystal displays and is therefore particularly preferred), or also in accordance with the IPS ("in-plane switching"=field parallel to the surface of the display) principle.

Suitable arrangements are known to the person skilled in the art, and the variants mentioned in the present application in the introduction, in the remainder of the description or in the drawings and claims should only be regarded as illustrative and are not intended to restrict the scope of the invention.

Further additives, such as plasticisers, dispersants, pigments, dyes (preferred), UV absorbers, fillers, inorganic polymers, organic polymers, anti-foaming agents, lubricants, antioxidants (such as hindered phenols, hindered amines, phosphorus-based antioxidants, sulfur-based antioxidants, oxygen scavengers or the like, for example in an amount of 0.1 to 10% by weight), acid scavengers (for example diglycidyl ethers of polyglycols, metal epoxides, epoxidised ether condensation products, diglycidyl ethers, for example of bisphenol A, epoxidised unsaturated fatty acid esters, epoxidised vegetable oils or the like, for example in an amount of 0.1 to 10% by weight), free-radical scavengers, agents for increasing the electrical conductivity, thickeners, antibleaching agents, preservatives, chemical stabilisers, such as sterically hindered amines (such as 2,2,6,6-tetraalkylpiperidines) or phenols, IR absorbers, agents for adjusting the refractive index, agents for reducing the gas permeability, agents for reducing the water permeability, antimicrobial agents, antiblocking agents (particularly preferred, also known as matting agents), which facilitate, for example, good ease of separation of protective films laid one on top of the other, for example (semi)metal oxides, such as silicon dioxide, titanium dioxide, aluminium oxide, zirconium oxide, calcium carbonate, kaolin, talc, calcined calcium silicate, hydrated calcium silicate, aluminium silicate, magnesium silicate or calcium phosphate, small inorganic particles based on phosphoric acid salts, silicic acid salts or carboxylic acid salts, or small crosslinked polymer particles, for example in an amount of 0.001 to 5% by weight, stabilisers other than those already mentioned, or the like, or mixtures of two or more such additives, can be added (for example added during preparation of the solution or dispersion of the components) to a compensation film in accordance with the invention. Additives of this type for the purposes of production of compensation films for polarisers in liquid-crystal displays are familiar to the person skilled in the art. The total amount of all further additives of this type used is preferably 0.1 to 25% by weight. % by weight data above in each case relate to the weight of the compensation film material.

Suitable plasticisers are conventional plasticisers, such as aliphatic dicarboxylic acid esters, for example dioctyl adipate, dicyclohexyl adipate or diphenyl succinate, esters and/or carbamates of unsaturated or saturated alicyclic or heterocyclic di- or polycarboxylic acids, such as di-2-naphthyl 1,4-cyclohexanedicarboxylate, tricyclohexyl tricarbamate, tetra-3-methylphenyl tetrahydrofuran-2,3,4,5-tetracarboxylate, tetrabutyl 1,2,3,4-cyclopentanetetracarboxylate, triphenyl 1,3,5-cyclohexyltricarboxylate, diisononyl 1,2-cyclohexanedicarboxylate, triphenyl benzene-1,3,5-tetracarboxylate, phthalic acid-based plasticisers apart from those of the formula I, such as diethyl, dimethoxyethyl, dimethyl, dioctyl, dibutyl, di-2-ethylhexyl or dicyclohexyl phthalate, bis(2-propylheptyl) phthalate, dicyclohexyl terephthalate, methylphthalyl methylglycolate, ethylphthalyl ethylglycolate, propylphthalyl propylglycolate, butylphthalyl butylglycolate, glycerol esters, such as glycerol triacetate, citric acid-based plasticisers, such as acetyl trimethyl citrate, acetyl triethyl citrate or acetyl butyl citrate, polyether-based plasticisers, or preferably (owing to improved to, in particular, synergistic efficacy with the plasticisers of the formula I, but also for reasons of environmental acceptability and good processability) phosphate-based plasticisers, such as triphenyl phosphate (very preferred), tricresyl phosphate, biphenyldiphenyl phosphate, butylenebis(diethyl phosphate), ethylenebis(diphenyl phosphate), phenylenebis(dibutyl phosphate), phenylenebis(diphenyl phosphate), phenylenebis(dixylenyl phosphate), bisphenol A diphenyl phosphate, diphenyl 2-ethylhexyl phosphate, octyl diphenyl phosphate or triethyl phosphate.

The total proportion of plasticisers in a compensation film according to the invention is, in each case based on the weight thereof, preferably in the range from 4 to 15% by weight, in particular in the range from 6 to 13% by weight, for example 8 to 11% by weight.

UV absorbers are selected from conventional UV absorber materials, which preferably absorb in the region of UV-A, UV-B and UV-C radiation (and preferably have not more than 10% absorption, preferably not more than 0.5% absorption, in particular not more than 0.2% absorption, in the visible region of electromagnetic radiation above a wavelength of 400 nm).

The conventional UV absorber materials used are preferably Tinuvin 326® (2-tert-butyl-6-(5-chlorobenzotriazol-2-yl)-4-methylphenol=2-(5-chloro-(2H)-benzotriazol-2-yl)-4-(methyl)-6-(tert-butyl)phenol="Bumetrizole") or Tinuvin 327® (2,4-di-tert-butyl-6-(5-chlorobenzotriazol-2-yl)phenol), both from Ciba Specialty Chemicals AG, Basel, Switzerland, Uvinul 3049® (2,2-dihydroxy-4,4-dimethoxybenzophenone; BASF AG, Ludwigshafen, Germany), Uvinul D-50® (2,2',4,4'-tetrahydroxybenzophenone; BASF AG) or mixtures of two or more of these UV protection additives, or in particular Tinuvin 326® alone.

IR absorbers can be admixed with a compensation film in order to adapt the retardation values at certain wavelengths, for example in an amount of 0.01 to 5 percent by weight, preferably 0.02 to 2 percent by weight, very preferably 0.1 to 0.5 percent by weight, based on the weight of the compensation film. Examples of corresponding IR absorbers are inorganic or preferably organic IR absorbers, such as cyanine dyes, metal chelates, aluminium compounds, diimmonium compounds, quinones, squarilium compounds and methine compounds, in particular materials from the area of photosensitive materials from silver halide photography. IR absorbers preferably exhibit an absorption in the range from 750 to 1100 nm, in particular from 800 to 1000 nm.

Preferred embodiments of the invention arise from the claims and in particular the independent claims, for which reason the claims are incorporated into the description here by way of reference.

Particularly preferred embodiments of the invention relate to optical compensation films which comprise one or more of the compounds of the formula I mentioned in the examples, preferably monoaxially or in particular biaxially stretched compensation films which have, in particular, the stretching ratios mentioned as preferred above; the retardation values Ro and Rth here are preferably set to the values mentioned as preferred above.

The following examples explain certain aspects of the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

Unless explicitly stated otherwise, all temperature values indicated in the present application, such as, for example, the melting point T(C,N), the transition from the smectic (S) phase to the nematic (N) phase T(S,N) and the clearing point T(N,I), are indicated in degrees Celsius (° C.). m.p. denotes melting point, cl.p. denotes clearing point. Furthermore, C=crystalline state, N=nematic phase, S=smectic phase and I=isotropic phase. The data between these symbols represent the phase-transition temperature in ° C. All concentrations and % values are indicated in percent by weight and relate to the respective mixture as a whole, comprising all solid or liquid-crystalline components, without solvents.

Furthermore, the following abbreviations are used (m, m: each, independently of one another, 1, 2, 3, 4, 5 or 6):

EXAMPLE 1

Compensation films according to the invention comprising in each case a compound of the formulae I1-I6 given above are produced as follows:

The cellulose acetate (triacetylcellulose, TAC) and the liquid-crystalline substance (for example a compound of the formulae I1 to I6) are weighed out into a glass bottle, where, as standard, the content of the liquid-crystalline substance according to certain aspects of the invention is 2.5% of the total amount of solids. This mixture is dissolved in dichloromethane with constant stirring. When the materials have completely dissolved, the solution is briefly heated to about 40 degrees Celsius and allowed to cool again. The solution should then contain no air bubbles and can be drawn onto a glass plate using a film-drawing frame. The thickness of the wet film is about 1000 μm (depending on the TAC concentration and the TAC film thickness to be achieved). The solvent evaporates, and the TAC film can be lifted off the glass plate. This is followed by drying in a drying cabinet at 80° C. in order to remove any residual solvent still present from the film.

The film is stored overnight at room temperature and then measured optically (determination of the Rth value). A section of the film is stored in a climatic cabinet at 60° C. and 95% relative atmospheric humidity (RH) and assessed for haze at time intervals (up to max. 1000 hours). For determination of the Ro value, a film section is stretched uniaxially in a hand stretching apparatus (up to max. 1.4-fold stretching).

The retardation Rth and the storage stability of the individual, unstretched compensation films are summarised below in Table 1 (TAC film thickness ~80 μm, Ro≈0 nm for the unstretched films).

TABLE 1

| Substance | Concentration in the TAC film | Rth ($\lambda$ = 550 nm) | Storage stability at 60° C./95% RH |
|---|---|---|---|
| CCPC-33 | 2.5% | −160 nm | >1000 h |
| CCPC-35 | 2.5% | −163 nm | >1000 h |
| CCP-3-A1 | 2.5% | −171 nm | >1000 h |
| CPC-2-3 | 2.5% | −118 nm | 600 h |
| CPC-2-5 | 2.5% | −125 nm | 600 h |
| CP-V-AN | 2.5% | −130 nm | >1000 h |
| CP-4-AN | 2.5% | −128 nm | slight haze after 72 h |
| CDU-3-S | 2.5% | −129 nm | slight haze after 260 h |
| CCU-3-AN | 2.5% | −149 nm | haze after 100 h |

Figure 1:
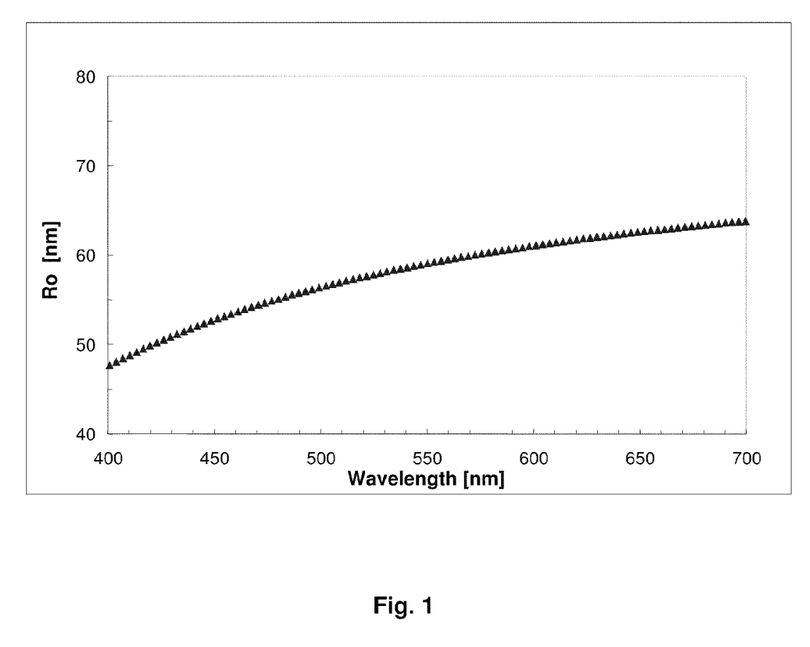
FIG. 1 and FIG. 2 show the retardation dispersion, i.e. Ro and Rth values at various wavelengths for a compensation film according to the invention in accordance with Example 1.
Figure 2:
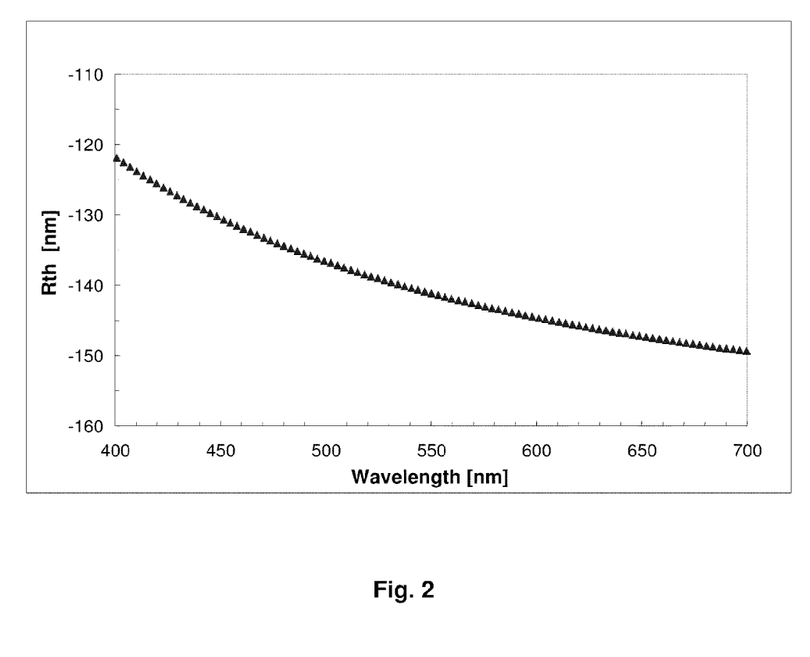

The optical dispersion (Ro or Rth at various wavelengths) of a stretched compensation film comprising compound CCPC-33 is depicted in FIG. 1 and FIG. 2 respectively. The compensation film exhibits negative dispersion of Ro and Rth, i.e. an increase in the absolute values of Ro and Rth with increasing wavelength.

COMPARATIVE EXAMPLE 1

For comparative purposes, a compensation film is produced as described in Example 1, but using a compound having three aromatic rings, of the following formula:

(PGP-2-5)

The retardation and the storage stability of the compensation film are summarised in Table 2 (TAC film thickness ~80 μm):

TABLE 2

| Substance | Concentration in the TAC film | Rth | Storage stability at 60° C./95% RH |
|---|---|---|---|
| PGP-2-5 | 2.5% | −167 nm | >1000 h |

Figure 3:
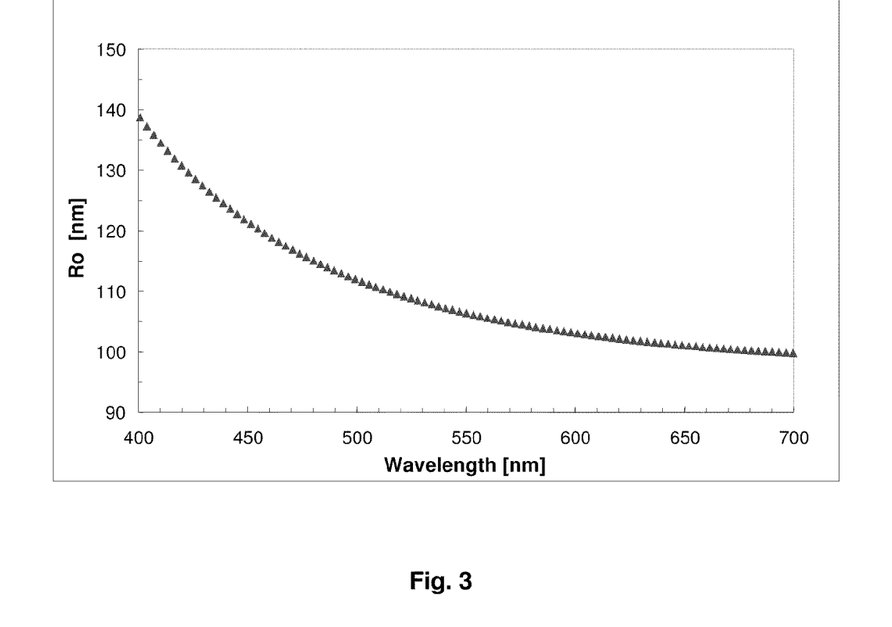
FIG. 3 and FIG. 4 show the retardation dispersion, i.e. Ro and Rth values at various wavelengths for a compensation film in accordance with Comparative Example 1.
Figure 4:
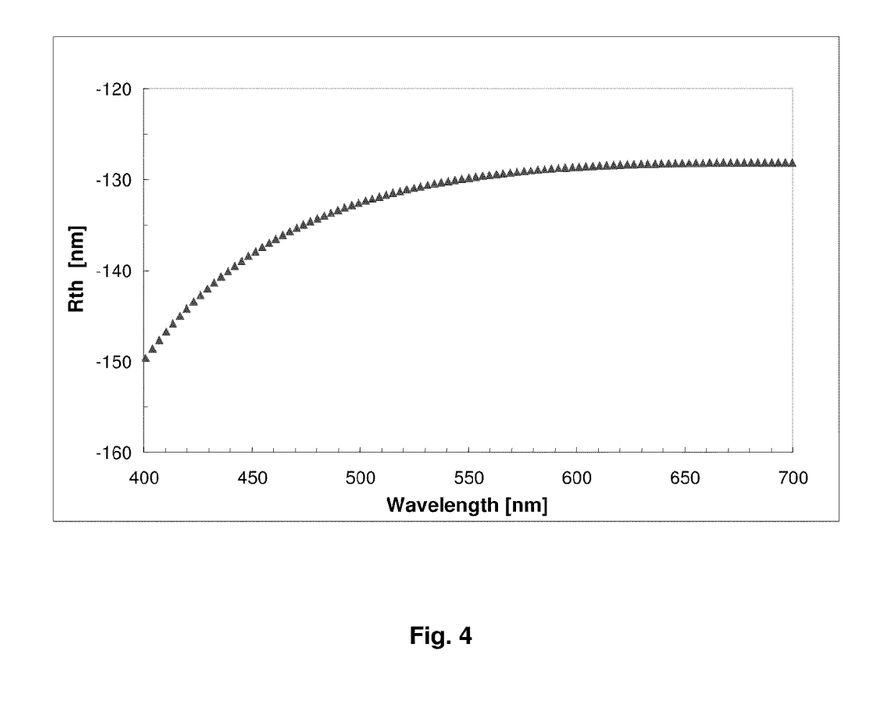

The optical dispersion (Ro or Rth at various wavelengths) of a stretched compensation film comprising PGP-2-5 is depicted in FIG. 3 and FIG. 4 respectively. The compensation film exhibits positive dispersion, i.e. a decrease in the absolute values of Ro and Rth with increasing wavelength.

As can be seen from Example 1 and Comparative Example 1, the retardation dispersion of the compensation film can be influenced on use of liquid-crystalline substances according to certain aspects of the invention (such as, for example, CCPC-33) in such a way that the dispersion of Ro and Rth exhibits precisely the opposite behaviour to a compensation film comprising the liquid-crystalline substance PGP-2-5. The dispersion of the compensation film can thus be matched better to the dispersion of the liquid-crystal display, and the contrast behaviour and colour reproduction (especially at greater viewing angles) can be improved.

This adaptation can, if desired, be improved through the use of a mixture of two or more compounds of the formula I with various degrees of retardation dispersion, i.e. the R(450)/R(550) values of the retardation film after stretching can thus be set precisely.

EXAMPLE 2

A 16% by weight solution of triacetylcellulose (TAC) (Eastman Che., Kingsport, USA, official name cellulose triacetate VM 149, degree of acetylation 60.8%) and triphenyl phosphate (TPP) as plasticiser (concentrations see Table 3) in methylene chloride/methanol 97/3 (w/w) is prepared in a 500 ml glass bottle. In each case, a compound of the formula I is added thereto in a concentration of 2.5%, based on the solids (TAC+TPP), and the entire mixture is dissolved overnight in a roller cabinet. These solutions are deaerated at 50° C. in a water bath, and knife-coated films are then produced in each case and dried overnight at 80° C.

The compound of the formula I to be added in accordance with the invention is compound CCPC-34. The retardation values Rth and Ro and the haze of the film before stretching are shown in Table 3 for TAC films comprising CCPC 34 (2.5% by weight) and various contents of the plasticiser TPP (% by weight):

TABLE 3

| Film thickness (μm) | % of TPP | % haze | Rth (λ = 632 nm) | Ro | Rth corrected to 80 μm |
|---|---|---|---|---|---|
| 78 | 0 | 0.6 | −152 | 0.6 | −156 |
| 77 | 4 | 0.4 | −143 | 0.9 | −148 |
| 84 | 8 | 0.7 | −142 | 0.4 | −137 |
| 72 | 10 | 0.5 | −125 | 0.7 | −138 |

The films produced in this way exhibited no significant haze, which indicates very good compatibility of additive and matrix. In addition, the dependence of the retardation values Rth on the plasticiser content is evident here.

Figure 5:
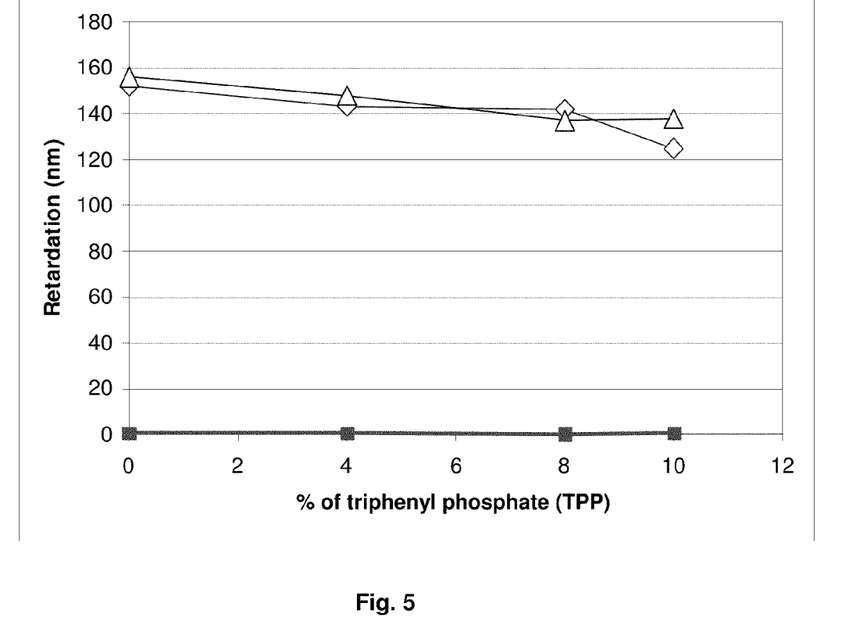
FIG. 5 shows the retardation Ro and Rth of compensation films in accordance with Example 2 as a function of the plasticiser content.

FIG. 5 shows the retardation values Ro (■), Rth (◇) and Rth corrected to 80 μm (Δ) of the unstretched films from Table 3 as a function of the concentration of the plasticiser TPP.

EXAMPLE 3

The films from Example 2 having a plasticiser content of 4, 8 and 10% are stretched uniaxially or biaxially as described below.

General Machine Description and Stretching Procedure

The laboratory stretching machine (Karo 4, Brückner, Siegsdorf, Germany) consists of a module for charging the sample, into which the film is inserted under ambient conditions, fixed on all four sides using four clips in each case, and the entire device is subsequently inserted into an oven module for pre-heating. After pre-heating, the sample moves back into the sample charging chamber and is stretched. After the device has been cooled, the clips can be released and the sample removed.

During the stretching operation, the mechanical elongation and the tension can be measured continuously, which, in a comparison of various materials, allows conclusions to be drawn on a design of a production unit (data not shown).

a) Stretching Operation:

Various settings of the stretching operation are possible:
Change of the stretching rate
Various stretching temperatures
Consecutive and simultaneous stretching in the biaxial process The suitable setting parameters for the present invention include:
Pre-heating for 1 minute at 160° C.
Stretching at 160° C.
Clip temperature 130° C.
Cooling time to approximately room temperature 20 sec ("freezing")
Stretching rate 1% per sec (1% per sec and 4% per sec in the case of asymmetrical biaxial stretching)
Stretching mode: monoaxial with shrinkage (=neck-in), monoaxial with fixed dimension perpendicular to the stretching direction, biaxial symmetrical (factor in MD different to in TD), biaxial asymmetrical (factor in MD=factor in TD)
Degree of stretching 1.0 to 1.2 in the casting direction (longitudinal direction, machine direction; MD) or in the transverse direction (TD) in the case of monoaxial stretching
Degree of stretching 1.0 to 1.2 in TD and 1.0 to 1.2 in various combinations in the case of biaxial stretching
Unless stated otherwise, the sample is stretched simultaneously at a slow rate of 1% per sec.

b) Assessment of the Result:

Firstly, the integrity of the sample after cooling and release from the clips is assessed visually. Initial sample size 70×70 mm, can be increased, for example, to about 85×85 mm after stretching. The usable area of the sample is approx. 60×60 mm, depending on the stretching conditions, since the edge region is lost due to the action of the clips. The sample is then placed between two crossed polarisers, and the polarisation colour arising is assessed. If the polarisation colour is uniform around the centre point of the film, the measurement values can be determined at this point.

The retardation values Rth and Ro of the films after stretching with various stretching factors are shown in Table 4, in which % p=plasticiser content, u=uniaxial, bi=biaxial.

TABLE 4

| | uniaxial Stretching factor uniaxial | | | | | |
|---|---|---|---|---|---|---|
| CCPC 34 2.5% | Rth (u) (4% p) | Ro (u) (4% p) | Rth (u) (8% p) | Ro (u) (8% p) | Rth (u) (10% p) | Ro (u) (10% p) |
| Unstretched | −143 | 0 | −140 | 1 | −125 | 1 |
| uniaxial 1.2× | −114 | 67 | −118 | 57 | −92 | 36 |

| | biaxial Stretching factor biaxial | | | | | |
|---|---|---|---|---|---|---|
| CCPC 34 2.5% | Rth (bi) (4% p) | Ro (bi) (4% p) | Rth (bi) (8% p) | Ro (bi) (8% p) | Rth (bi) (10% p) | Ro (bi) (10% p) |
| Unstretched | −149 | 1 | −145 | 0 | −125 | 1 |
| biaxial 1.2 × 1.05 | −138 | 37 | −119 | 29 | −89 | 15 |

Monoaxial (1:1.20) and asymmetrical biaxial stretching (1.05:1.20) were carried out. The term "mono" here means that there was no holding at the side in the case of monoaxial stretching, i.e. "neck-in" occurs (stretching factor 1.2).

Figure 6:
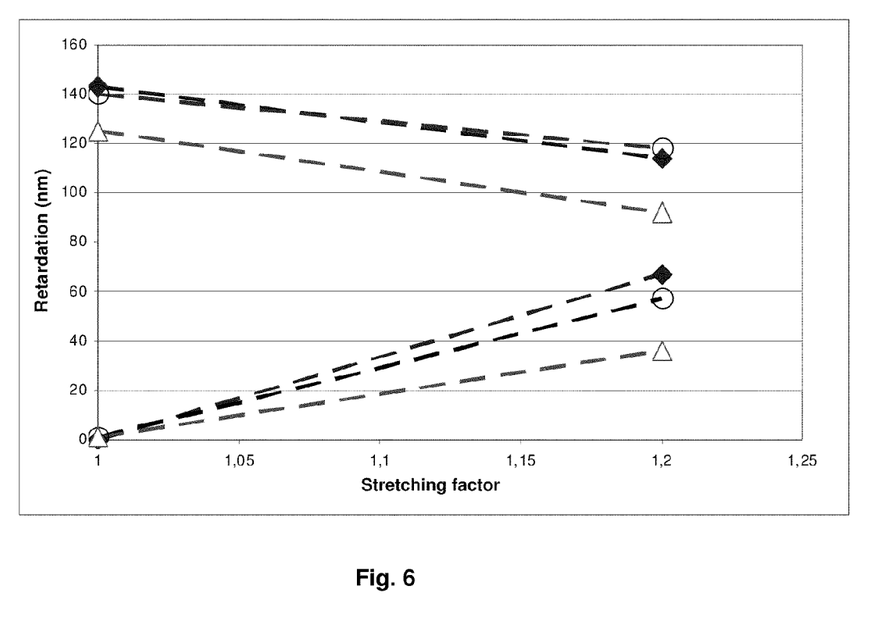
FIG. 6 shows the retardation Ro and Rth of stretched compensation films in accordance with Example 3 as a function of the stretching factor.

FIG. 6 shows the retardation values Rth (top lines) and Ro (bottom lines) of the uniaxially stretched films from Table 4 as a function of the stretching factor for a plasticiser concentration of 4% (♦), 8% (○) and 10% (Δ).

EXAMPLE 4

A 16% by weight solution of triacetylcellulose (TAC) (Eastman, Kingsport, USA, official name cellulose acetate VM 149, acetyl content 43.4 to 43.8% (w:w)) and triphenyl phosphate (TPP) and in some cases additionally ethylphthalyl ethylglycolate (EPEG) as plasticiser in methylene chloride/methanol 97/3 (w/w) is prepared. The solids content was in each case adjusted to 16%.

Recipes A comprise 8% (w:w) of TPP, recipes B comprise 8% of TPP and 2% of EPEG (w:w), based on the solids. This is dissolved overnight in a roller cabinet. This coating is then portioned, and in each case additive 1 is added in the concentrations 2.5%, 4% or 5%, based on the solids (TAC+plasticiser), and furthermore solvents are added (in order to obtain a 16% solution again). This mixture is redissolved overnight in a roller cabinet. These coatings are deaerated in a water bath, and in each case films are drawn onto glass plates at room temperature. The casting gap here was set to 390 µm to 650 µm, depending on the desired film thickness. Deaeration of the drawn films at room temperature for about 5 minutes. Drying of the glass plates with the films for about 18 h at 80° C. in a fan-assisted drying cabinet.

The liquid-crystalline additive to be added in accordance with certain aspects of the invention (additive 1) consists of a mixture of 75% of a component from substance class CCPC-nm and 25% of a component from substance class CCP-n-Am.

The composition of the films is shown in Table 5.

TABLE 5

| Sample | Additive 1 (% based on solid) | TPP (% based on solid) | EPEG (% based on solid) | TAC (% based on solid) | Additive 1 (% based on TAC) |
|---|---|---|---|---|---|
| A1 | 5 | 8 | — | 87 | 5.43 |
| A2 | 2.5 | 8 | — | 90.5 | 2.69 |
| B1 | 5 | 8 | 2 | 85 | 5.56 |
| B2 | 4 | 8 | 2 | 86 | 4.44 |

The thickness, haze and retardation are measured, as described above, at room temperature after drying and removal of the films. The optical properties of the films before stretching are summarised in Table 6.

TABLE 6

| Sample | Thickness (µm) | Ro (nm) | Rth (nm) |
|---|---|---|---|
| A1 | 74 | 1 | −214 |
| A2 | 82 | 1 | −129 |
| B1 | 46 | 1 | −125 |
| B2 | 53 | 1 | −118 |

EXAMPLE 5

Retardation Values and Wavelength Dispersion after Stretching at Various Stretching Factors for Films The films produced and characterised in Example 4 are stretched in a KARO 4 laboratory stretching unit (Brückner, Sigsdorf, Germany).

After stretching with various degrees of stretching and temperatures, the Ro and Rth values are determined as a function of the wavelength using an AxoScan polarimeter (Axometrics). The results are summarised in Table 7.

Ro [450 nm], Ro [550 nm] and Ro [650 nm] in each case correspond to the "in-plane" retardations measured at the wavelengths of 450, 550 and 650 nm respectively; the same applies to the wavelength-dependent Rth ("out-of-plane") values.

TABLE 7

| | A1 | A2 | B1 | B2 |
|---|---|---|---|---|
| Stretching temperature (° C.) | 160 | 160 | 170 | 170 |
| Degree of stretching (MD × TD)* | 1.05 × 1.2 | 1.1 × 1.2 | 1.1 (only MD) | 1.1 × 1.2 |
| Thickness (µm) | 62 | 65 | 40 | 45 |
| Ro [550 nm] (nm) | 160 | 69 | 111 | 71 |
| Rth [550 nm] (nm) | −216 | −141 | −162 | −128 |
| Ro [450 nm]/ Ro [550 nm] | 1.031 | 1.014 | 1.036 | 1.028 |
| Ro [650 nm]/ Ro [550 nm] | 0.981 | 0.986 | 0.982 | 0.986 |
| Rth [450 nm]/ Rth [550 nm] | 0.986 | 0.943 | 0.981 | 0.969 |
| Rth [650 nm]/ Rth [550 nm] | 1.014 | 1.035 | 1.006 | 1.008 |

*MD = stretching in the casting direction (machine direction), TD = stretching in the film plane perpendicular to the casting direction (transverse direction).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 102009009093.2, filed Feb. 14, 2009.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An optical compensation film based on cellulose acylate for liquid-crystal displays, comprising:
   a mixture of a cellulose acylate and one or more compounds having two or more rings, where at most one of these rings is an aromatic ring,
   wherein the one or more compounds having two or more rings are of formula I:

$$R^1\text{-}A^1\text{-}(Z^1\text{-}A^2)_m\text{-}R^2 \qquad \text{I}$$

in which
   $R^1$ and $R^2$ each, independently of one another, denote F, Cl, Br, I, OH, —CN, —NO$_2$—, —NCO, —NCS, —OCN, —SCN, —NH$_2$, —SF$_5$, straight-chain or branched alkyl or alkoxy having 1 to 12 C atoms, in which one or more CH$_2$ groups are each optionally replaced by —O—, —S—, —CO—, —CO—O—, —O—CO—, —O—CO—O—, —CH=CH—, —C≡C—, —NR$^0$—, —CO—NR$^0$—, —NR$^0$—CO— in such a way that O and/or S atoms are not linked directly to one another, and in which one or more H atoms are each optionally replaced by F, Cl or CN,
   $A^1$ and $A^2$ each, independently of one another, denote one of the radicals $A^1$ and $A^2$ present optionally denotes in which $L^1$ and $L^2$ each, independently of one another, denotes H, F or Cl $Z^1$ on each occurrence, identically or differently, denotes —COO—, —OCO—, —CH$_2$O—, —OCH$_2$—, —CH$_2$S—, —SCH$_2$—, —CF$_2$O—, —OCF$_2$—, —CH$_2$CH$_2$—, —CH$_2$CF$_2$—, —CF$_2$CH$_2$—, —C$_2$F$_4$—, —CH=CH—, —CH=CF—, —CF=CH—, —CF=CF—, —C≡C— or a single bond, $R^0$ denotes hydrogen or C$_1$-C$_7$-alkyl, and m denotes an integer 1, 2, 3 or 4.

2. The optical compensation film according to claim 1, wherein the proportion by weight of said one or more compounds having two or more rings is 0.5 to 10 percent by weight, based on the total weight of the compensation film.

3. The optical compensation film according to claim 1, which has a thickness of 20 to 150 μm.

4. The optical compensation film according to claim 1, which has a retardation value Ro of 30 to 70 nm and a retardation value Rth of −100 to −160 nm, where Ro stands for the retardation value in the direction of the plane and Rth stands for the retardation value in the direction of the thickness of the optical compensation film.

5. The optical compensation film according to claim 1, which has a retardation value Ro of 30 to 90 nm and a retardation value Rth of −160 to −270 nm, where Ro stands for the retardation value in the direction of the plane and Rth stands for the retardation value in the direction of the thickness of the optical compensation film.

6. The optical compensation film according to claim 1, wherein the cellulose acylate is a cellulose acetopropionate (CAP) and/or a cellulose acetate.

7. The optical compensation film according to claim 1, wherein the compound of formula I is one of the following sub-formulae:

-continued

I5

I6 in which $R^1$ and $R^2$ are as defined for the compound of formula I, and $L^1$ and $L^2$ each, independently of one another, denote H or F.

8. The optical compensation film according to claim 1, wherein $R^2$ denotes —C≡C—CN, —C≡C—CH$_3$ or —NCS.

9. The optical compensation film according to claim 1, wherein $R^1$ denotes an alkenyl group having 2 to 7 C atoms.

10. The optical compensation film according to claim 1, wherein the one or more compounds having two or more rings contain no aromatic ring.

11. A polarizer plate which has an optical compensation film according to claim 1.

12. A liquid-crystal display which has at least one optical compensation film according to claim 1.

13. A liquid-crystal display according to claim 12, which has precisely one optical compensation film according to claim 1.

14. A liquid-crystal display, which has two or more optical compensation films according to claim 1.

15. A liquid-crystal display according to claim 12, which is a VA display.

16. A process for preparing an optical compensation film according to claim 1, comprising adding one or more of the compounds having two or more rings to a mixture used in the preparation of the compensation film during the process for the preparation of the film.

17. A process according to claim 16, which is a film-casting process.

18. A process according to claim 16, comprising stretching the film obtainable after casting and drying is carried out, where the stretching can be monoaxial, without or with holding perpendicular to the stretching direction, or biaxial.

19. A process for preparing a polarizer plate, comprising applying an optical compensation film according to claim 1 to a polarizer membrane or to a protective layer of a polarizer membrane.

20. A process for preparing a liquid-crystal display, comprising applying at least one polarizer plate to which an optical compensation film according to claim 1 is applied.

21. A process according to claim 20, wherein precisely one optical compensation film according to claim 1 is used in the preparation of the liquid-crystal display.

22. A process according to claim 20, wherein two or more optical compensation films according to claim 1 are used in the preparation of the liquid-crystal display.

23. The optical compensation film according to claim 1, wherein the one or more compounds having two or more rings contain one aromatic ring.

24. An optical compensation film prepared by the process according to claim 16.

25. The optical compensation film according to claim 1, wherein the film is biaxially stretched.

26. The optical compensation film according to claim 1, wherein the film is stretched in the range from 3 to 40%, based on the original length or width of the compensation film.

27. The optical compensation film according to claim 2, wherein the proportion by weight of said one or more compounds having two or more rings is 2 to 8 percent by weight, based on the total weight of the compensation film.

28. The optical compensation film according to claim 7, wherein the compound of formula I is of sub-formulae I2, I3 or I4, in which one of the $R^1$ and $R^2$ is —C≡C—CN or —C≡C—CH$_3$.

29. The optical compensation film according to claim 7, wherein the compound of formula I is of sub-formulae I2, I3 or I4, in which one of the $R^1$ and $R^2$ is an alkenyl group having 2 to 7 C atoms.

30. The optical compensation film according to claim 7, wherein the compound of formula I is of sub-formulae I5 or I6, in which $L^1$ is F and $L^2$ is F or H.

31. The optical compensation film according to claim 7, wherein the compound of formula I is of the following sub-formulae:

I1a

I2a

I3a

I4a

I4b

I5a

I6a wherein
alkyl and alkyl* each, independently of one another, denote a straight-chain alkyl radical having 1, 2, 3, 4, 5 or 6 C atoms, alkenyl denotes a straight-chain alkenyl radical having 2, 3, 4, 5 or 6 C atoms,
(O) denotes an oxygen atom or a single bond,
$X^0$ denotes CN or $CH_3$, and
$L^1$ and $L^2$ each, independently of one another, denote H or F.

* * * * *